3,004,921
PREPARATION OF COLLOIDAL DISPERSIONS OF FINE-PARTICLE SIZE SILICA HYDROGEL IN POLYOLS
Ernest Stossel, New York, N.Y., assignor to Argus Chemical Corporation, Brooklyn, N.Y., a corporation of New York
No Drawing. Filed June 11, 1958, Ser. No. 741,239
2 Claims. (Cl. 252—309)

This invention relates to the preparation of colloidal dispersions of silica in polyols, and more particularly to the preparation of such colloidal dispersions directly from the wet precipitate of finely divided hydrated silica in the form of coherent aggregates.

It further relates to simplified methods of controlling the particle size of the precipitated silica so as to render the wet precipitate easily dispersible in polyols, thus partly or completely substituting a polyol-phase for the water phase, while maintaining the gel-structure.

Lubricating gels of outstanding properties are formed from polyols by addition of solid thickening agents, such as fine-particle size silica or silica-aerogel. My new process offers great technical and economical advantages in the preparation of these gels by eliminating the operation involved in first preparing a silica aerogel and subsequently incorporating it into the polyols.

The viscosity of water-soluble polyols which are used as humectants is rapidly reduced by addition of water or by rise in temperature. Materials, such as paper, textiles, tobacco, glue compositions and cosmetics, conditioned by such polyols to retain their softness, become soggy or limp in damp atmospheres. Dispersing colloidal silica in these polyols has an important effect on the physical properties of the polyols. I can maintain the consistency of the dispersions relatively constant, even when water content and temperature of the dispersion fluctuate over a wide range.

For instance, a sorbitol solution of 80% has a viscosity of about 850 cps. at 25° C. This viscosity is reduced to less than 5 cps. by addition of equal amounts of water. However, when in accordance with the present invention 10% of colloidal silica has been incorporated in a 40% sorbital solution, the mixture will acquire the consistency of a gel, which does not flow at 25° C., or even at 100° C.; it loses its water content at the latter temperature only very slowly, except when vigorously stirred.

It is well known that drying of a silica gel by evaporation at elevated temperatures, or even at ambient temperatures in vacuo, leads to agglomeration of the silica, which cannot be any longer dispersed in polyols. In order to conserve the fine particle size of a silica gel, cumbersome and rather expensive methods, such as adding polar organic liquids and azeotropic distillation, are usually applied.

It is the object of the present invention to provide a method for regulating the water content of a silica dispersion containing polyols, while maintaining the finely divided state of the silica.

It is another object to solvate a freshly precipitated silica in polyols, and then to remove, by evaporation, as much water as desired.

Other objects of the invention will appear from the description hereinafter set forth.

A colloidal silica dispersion in polyols of the above-mentioned type can be easily prepared, e.g. by heating a mixture of 40% of crystallized sorbitol and 100 parts of wet precipitate of silica, consisting of 10% silica of fine particle size and 90% water, with agitation, until 60 parts of water have evaporated. When the solid sorbitol is added to the silica precipitate, the mixture liquefies. The sorbitol solution solvates the silica to a nearly transparent gel, which becomes increasingly more viscous when heated. When the water content is further reduced by heating and simultaneous stirring of the thixotropic gel, a solid mass is eventually formed, which disintegrates to a powder easily dispersible in equal parts of hot water to a transparent gel.

The colloidal dispersions of silica in other water-soluble polyols show similar behavior. By dispersing silica in accordance with this invention in sugar solutions, corn syrup or molasses, a powder base for agricultural purposes, readily dispersible in water, can be most economically prepared. Also, in accordance with the invention, the precipitate may be intimately mixed with starch—with or without the addition of solubilizing agents—and subjected to heat treatment, whereafter the gel can be reduced to a powder, while water-soluble starch is formed. Such a powder is readily dispersible in water, and can be used for various industrial applications.

In the preparation of polyesters, the silica accelerates the rate of reaction; it remains in the ester as uniformly dispersed reinforcement, and increases the melting point of lacquer resins.

In the preparation of polyurethane-foams based on polyethers, the incorporation of colloidal silica into the polyethers in accordance with the present invention will yield improved products.

Certain water-soluble dispersions of silica in polyols become hydrophobic when the water is completely removed. This phenomenon can be of value in retarding loss of sorbitol, pentaerythritol and other polyols from vinyl floor-tiles, when they are cleaned with aqueous soap solutions.

The term "polyols," as used in the specification and claims, comprises:

(a) Glycols with free OH groups, such as ethylene glycol, propylene glycol, 1,4-butanediol, hexylene glycol, glycerol, sorbitol, mannitol, pentaerythritol;

(b) Glycols, wherein a part of the OH groups is etherified, such as diethylene glycol, dipropylene glycol, tri-, tetra- and polyethyleneglycols, and ether glycols, for instance, sold under various trade names, e.g. Carbowax, Ucon, Pluronics, Carbitol, Cellosolve;

(c) Carbohydrates, such as glucose, mannose, fructose, cane sugar, molasses, starches, including modified starches, and dextrines;

(d) Acids derived from sugar, such as gluconic acid.

The present invention can be carried out in a great variety of ways. When colloidal dispersions of silica in polyols are required with a low content of soluble salts or free of salts, a wet precipitate of finely divided, hydrated silica is first prepared and the precipitate washed in well-known manner. The washed precipitate is then digested by the polyol solution, and, if desired, homogenized, before being submitted to the evaporation step. Completely stable colloidal dispersions of hydrated silica in polyols are so obtained. When silica dispersions in polyols will have to be applied in mixture with soluble salts, these salts are advantageously formed during the precipitation step of the silica, and will remain intimately distributed in the colloidal dispersion. For example, mixtures of potassium lactate and glycerol, used as conditioning agents and humectants, can be easily prepared by first dispersing a potassium silicate solution in glycerol and precipitating the silica gel by acidifying the mixture with lactic acid solution. The precipitated silica gel becomes immediately solvated by the polyol present in the solution. A very stable and uniform mixture of potassium lactate and colloidal silica in polyol is obtainable, which can be easily concentrated by evaporation of water. This concentrated and stabilized gel can then be diluted with water or polyols to be brought to the required concentration for use.

The acidification of the alkali silicate dispersion in polyols can be achieved by any water-soluble acid, so as to form the proper alkali salts. Orthophosphoric acid, e.g. can be used as acidifying agent to form mono-, di-, or trisodium phosphates.

In the specification and claims the expression "fine-particle size silica hydrate" is understood to designate a particle size of less than 5 microns.

The invention will now be more fully described in a number of examples, but it should be understood that these are given by way of illustration and not of limitation and that many changes can be made in the details without departing from the spirit of the invention.

PREPARATION OF SILICA PASTE

In carrying out the present invention a wet precipitate of finely divided, hydrated silica in the form of coherent aggregates was prepared by acidifying waterglass-solution with diluted surfuric acid in well-known manner. The silica hydrogel was washed free of soluble salts and reduced by filtration to a mass of the consistency of heavy grease containing 10% silica and 90% water. In thin layers, it is translucent and slippery to the touch. It can be easily re-suspended in water by mechanical agitation to form a smooth suspension. In the following examples this 10% hydrogel suspended in water will be called, "silica-paste."

*Example 1*

100 lbs. of silica paste containing 10% silica, as described, were mixed with 50 lbs. of glycerol. The mixture liquefied and was heated with agitation until, by evaporation of 50 lbs. of water, a total weight of 100 lbs. was reached. A clear, practically transparent gel was obtained when agitation stopped. The thixotropic gel was diluted in the ratio of 1 part gel:½ part of water to a transparent, viscous fluid, which upon heating becomes more viscous and eventually sets to a jelly which does not melt at 100° C.; when heated without agitation, it retains the water very strongly in contrast with other glycerol-water systems gelled by addition of organic thickening agents.

This unusual behavior became more pronounced when such a silica-glycerol-gel was "diluted" by adding sorbitol instead of water and then heated.

Similar gels were obtained by substituting other water-soluble polyols or polyol mixtures for glycerol or sorbitol.

The choice of the polyol mixture will depend on the final use of the product.

*Example 2*

250 lbs. of silica paste were air-dried to a weight of 100 lbs. The resulting powder contained 75% water and 25% silica. This powder was still easily dispersible in water. 100 lbs. of the powder were mixed with 150 lbs. of diethylene glycol, and the mixture, liquefied by mechanical agitation, was passed through a colloidal mill. A clear, viscous liquid emerged, which rapidly set to a transparent gel. This gel behaved in every respect like the gel prepared in Example 1. 50 lbs. of this gel were heated with agitation until 12 lbs. of water had been evaporated. A white powder was obtained which consisted, as found by analysis, of 78% diethylene glycol, 17% hydrated silica, and 5% free water.

Upon heating with half of its weight of water, it yielded a clear jelly; this proved that the hydrated silica was of extremely fine particle size.

*Example 3*

Instead of the polyols used in Example 1, other polyols or polyol mixtures, as previously listed in the disclosure, afford similar colloidal silica dispersions when admixed in the same weight ratios.

*Example 4*

100 parts of 50% sorbitol solution were mixed with 100 parts of potassium silicate solution containing 12% $SiO_2$ and 4.8% $K_2O$, and stirred until a uniform liquid was obtained. This liquid was heated to 85° C. and poured, with vigorous stirring, into 18 parts of a 50% solution of orthphosphoric acid. The liquid became increasingly viscous, until it set to a heavy hard gel. After standing for 10 to 15 minutes, the gel started to liquefy, due to the solvating action of the sorbitol. Stirring was continued, and within less than 30 minutes the gel became a translucent viscous liquid. By more vigorous agitation, the time could be shortened.

The heavy liquid was then passed to a colloid mill, from which it emerged as a transparent viscous fluid. This was immediately brought to an evaporator and concentrated to a silica content of 8%.

The mixture of potassium phosphate and colloidal silica in sorbitol may be used as a humectant solution. It can easily be diluted with water or other polyols, as in Examples 1 or 2.

Substitution of a lactic acid solution for its equivalent of phosphoric acid yielded mixtures of potassium lactate and silica in polyols. Other soluble silicate solutions of different concentrations and alkali oxide:$SiO_2$ ratios can be substituted for the potassium silicate solutions in order to meet special requirements.

*Example 5*

350 grams waterglass containing 8.9% $Na_2O$ and 28.5% $SiO_2$ were diluted with 350 g. of water.

This was dispersed in 1000 g. 70% corn syrup and poured, as in Example 4, into 210 g. 44% lactic acid solution.

The procedure was followed as described in Example 4. The resulting gel is, in appearance and properties, very similar to the one obtained in that example.

*Example 6*

100 lbs. silica paste, air-dried to a silica content of 20%, were added, with stirring, in small portions to 150 lbs. polyethylene glycol 1500, heated to a temperature of 120° C. This temperature was maintained until the whole silica paste was added. No water chemically bound to the silica evaporated, while the free water content was reduced to 4%.

The heavy paste was passed through a homogenizer, and became, after cooling, a powdery mass containing 14% hydrated silica. The powder disintegrated in equal parts of hot water to a transparent gel. On further dilution with water, an extremely fine-particle size silica could be made to settle out eventually.

This silica dispersion in polyol can be esterified with acids to form esters and polyesters.

In the dispersions made according to the present invention, the ratio of silica hydrate:polyol should be from one part by weight of silica hydrate, calculated as SiO:0.2–50, preferably 0.3–20 parts by weight of polyol.

The water content of silica hydrate after evaporation consists of at least 15% bound water calculated on $SiO_2$.

I claim:

1. A process of preparing compositions consisting of colloidal dispersions of silica hydrogel of a particle size of about 5μ, a water-soluble alkali metal salt used as an ingredient in humectants and a polyol selected from the group consisting of glycerine, ethylene glycol, polyethlene-glycol, sorbitol, and the etherified derivatives of said polyols, which comprises mixing an alkali metal silicate with 0.2 to 50 parts by weight of said polyol, calculated on $SiO_2$, and precipitating silica hydrogel by acidifying the mixture with an acid capable of forming with the alkali metal of the silicate said humectant salt, thereby immediately solvating the precipitated silica hydrogel by the polyol present in the mixture, and evaporating water to a silica content from 8–25%.

2. A process of preparing compositions consisting of colloidal dispersions of silica hydrogel of a particle size of about 5μ, a water-soluble alkali metal salt used as an ingredient in humectants and a polyol selected from the group consisting of glycerine, ethyleneglycol, polyethyleneglycol, sorbitol, and the etherified derivatives of said polyols, which comprises mixing an alkali metal silicate with 0.2 to 50 parts by weight of said polyol, calculated on $SiO_2$, and precipitating silica hydrogel by acidifying the mixture with an acid capable of forming with the alkali metal of the silicate said humectant salt, thereby immediately solvating the precipitated silica hydrogel by the polyol present in the mixture, and evaporating water in the presence of said polyol while maintaining the finely divided state of the silica by the continued solvating action of the polyol.

References Cited in the file of this patent

UNITED STATES PATENTS

| | | |
|---|---|---|
| 1,922,006 | Von Hoessle | Aug. 8, 1933 |
| 2,375,738 | White | May 8, 1945 |
| 2,383,653 | Kirk | Aug. 28, 1945 |
| 2,563,606 | Kimberlin et al. | Aug. 7, 1951 |
| 2,635,056 | Powers | Apr. 14, 1953 |
| 2,739,076 | Iler | Mar. 20, 1956 |